United States Patent [19]

Porter, Jr.

[11] Patent Number: 4,649,530

[45] Date of Patent: Mar. 10, 1987

[54] COMBINATION SEISMIC CABLE

[75] Inventor: James A. Porter, Jr., Houston, Tex.

[73] Assignee: Litton Resources Systems, Alvin, Tex.

[21] Appl. No.: 724,898

[22] Filed: Apr. 19, 1985

[51] Int. Cl.$^4$ ............................ G01V 1/20; G01V 1/38
[52] U.S. Cl. ...................................... 367/154; 367/20; 181/112
[58] Field of Search .............................. 181/112, 122; 339/151 C; 367/20, 153, 177, 37, 149, 154, 173

[56] References Cited

U.S. PATENT DOCUMENTS

| | | | |
|---|---|---|---|
| 3,435,410 | 3/1969 | Babb | 340/7 |
| 3,629,801 | 12/1971 | Brede | 340/15.5 |
| 3,866,162 | 2/1975 | Florian | 340/17 |
| 3,921,755 | 11/1975 | Thigpen | 181/122 |
| 4,078,223 | 3/1978 | Strange | 181/112 |
| 4,571,018 | 2/1986 | Annoot | 339/157 R |

FOREIGN PATENT DOCUMENTS 2137750  10/1984  United Kingdom ................. 367/20

Primary Examiner—Deborah L. Kyle
Assistant Examiner—Ted L. Parr
Attorney, Agent, or Firm—Barry C. Kane; Robert E. Lowe

[57] ABSTRACT

I provide a combination land/bay cable capable for simultaneous use on land and in water-covered areas. When the cable section is placed in a water-covered area suitable for hydrophone use, a polarized plug containing an impedance matching transformer is detachably connected to a polarized socket. The transformer connects the hydrophones to a transmission line. If the cable is to be used on land, the transformer is unplugged deactivating the hydrophones and at least one geophone having a substantially identical plug is inserted in the socket. The plug connects the geophone to the transmission line and leaves the hydrophones inactive.

13 Claims, 4 Drawing Figures

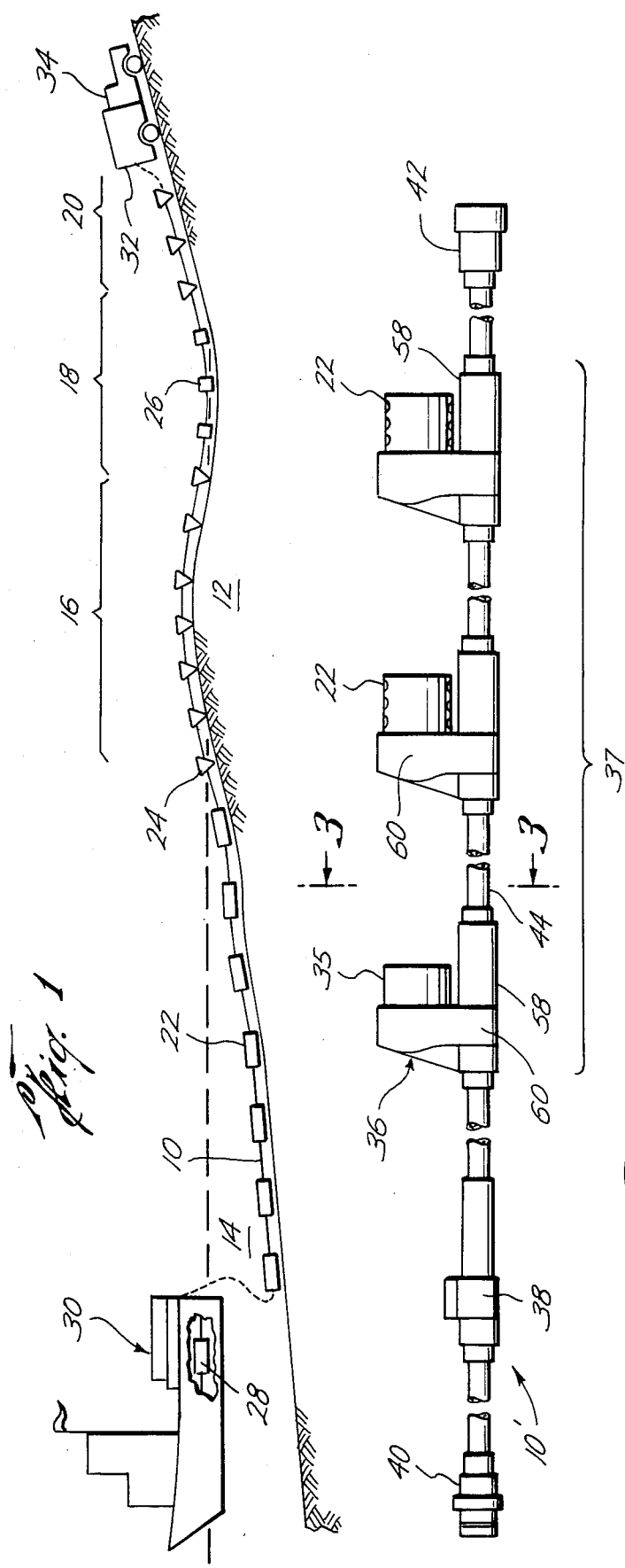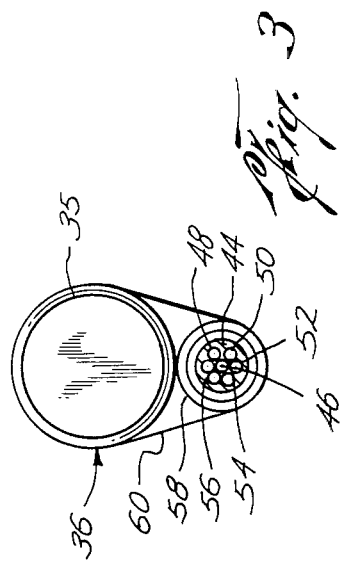

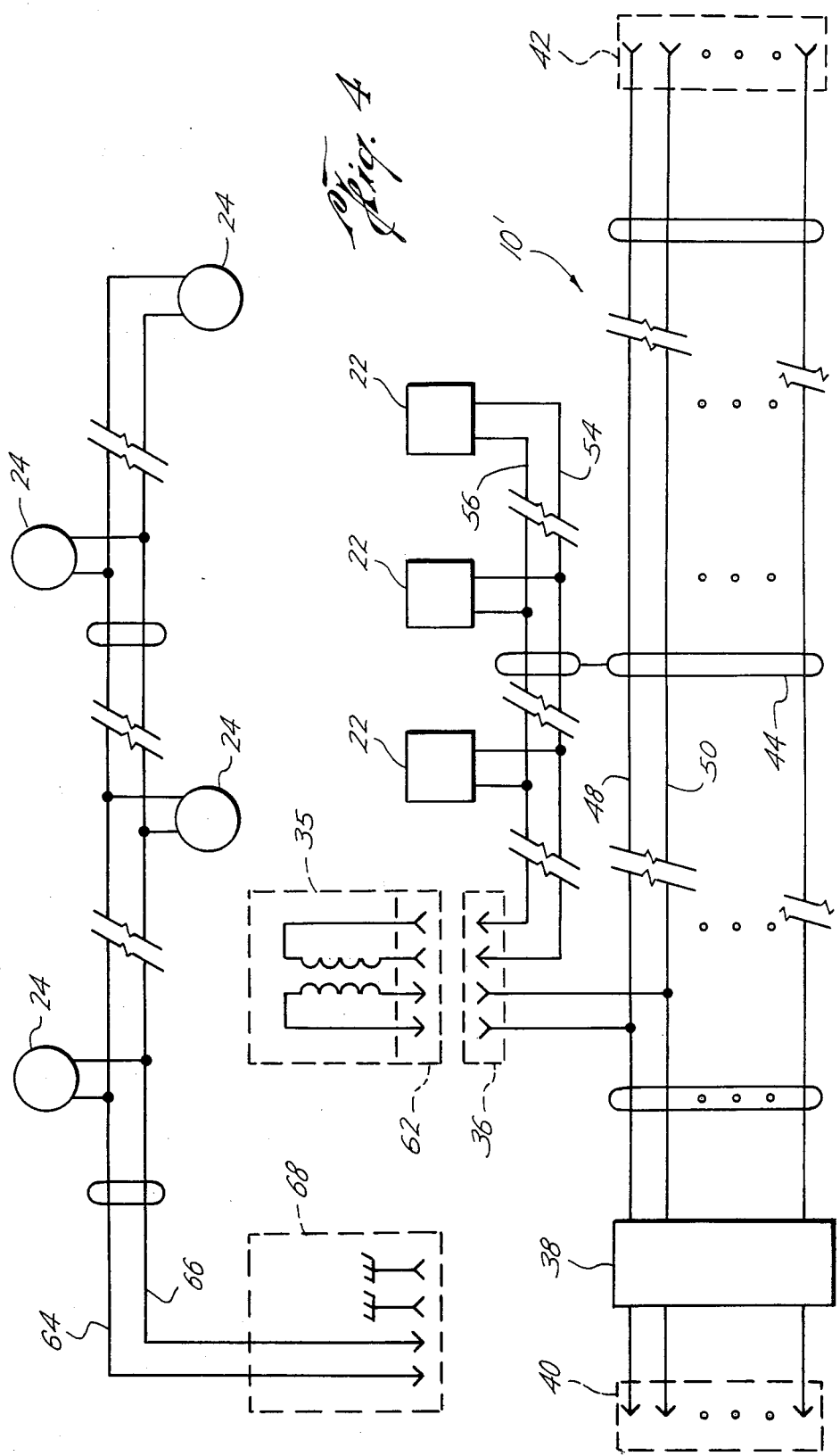

COMBINATION SEISMIC CABLE

BACKGROUND OF THE INVENTION

1. Field of the Invention

This invention relates to seismic exploration and more particularly to a combination seismic cable for use in both marine and land exploration.

2. Discussion of the Prior Art

To fully understand the subsurface characteristics of the earth, seismic surveys must necessarily be conducted across many different environments. Many of the different environments require specific types of equipment to carry out the survey. In seismic exploration over the continental shelf, ships tow long liquid-filled plastic jackets containing hundreds of hydrophones. In bays, marshes, and along shorelines, small boats and buggies lay watertight, hardwired cables and hydrophones which are connected to a recording unit aboard a ship or marsh vehicle. Onshore seismic crews lay out complex arrays of detachable cables and geophones by truck and by foot.

Convention was that seismic cables designed for specific environments were not intermatable with cables designed for other environments. That is to say that a marine streamer could not be readily connected to a marsh cable and so on. Thus a marine seismic crew would survey as close to shore as possible at which point a bay crew would survey towards shore from where the ship could not. A separate seismic land crew would survey from the shoreline inland.

If a region including both land and marine environments needed to be surveyed simultaneously, two or more crews would have to work in concert. Often times, projects would run overtime because of the lack of synchronization between the crews. In some cases, seismic data would be duplicated by each crew.

A need exists for a seismic cable assembly that can be used both in shallow marine/marsh environments as well as on land. Traditional land cable systems have "takeouts" along the cable for detachably connecting other cables or geophones. Land cables are not suitable for use in water-covered environments because of leakage of water into the connectors. Traditional bay and marsh cable systems consist of a hydrophone and an integral impedance matching device such as a transformer encased in watertight housings hardwired to the cable. The labor involved in removing the hydrophones and re-wiring geophones in their place precludes the use of bay and marsh systems on land.

A conventional bay and marsh cable system provides a plurality of paralleling watertight connectors or "takeouts". The hydrophone and its integral impedance transformer previously mentioned are detachably connected to the cable at each takeout. For use on land, the hydrophone and transformer are disconnected from each takeout and one or more geophones are connected thereto.

In the conventional cable system the hydrophone or geophone must be physically removed from the cable to be rendered inactive. Attempts at deactivating a hydrophone by simply loosening the connector would result in water leakage into the connector.

It is an object of this invention to provide a seismic cable for use in marine/marsh and land seismic exploration.

It is another object of this invention to provide a seismic cable system where hydrophones and geophones may be rapidly connected to and disconnected from the cable.

It is yet another object of this invention to disconnect the hydrophones without physically removing them from the cable and connecting at least one geophone thereto.

SUMMARY OF THE INVENTION

In accordance with an aspect of the instant invention, a plurality of cable sections are interconnected to form a spread. Each cable section consists of at least one multi-conductor trunk line disposed between identical end connectors. At least one watertight receptacle is connected to the cable section to conductors paralleling the trunk line. At least one hydrophone is connected to the paralleling conductors. A transformer is connected to a plug detachably connected to the receptacle, thereby connecting the hydrophone to the trunk line. With the transformer unplugged from the cable, the hydrophone is disconnected from the trunk line although not physically disconnected from the cable. One or more geophones may be connected to the trunk line by a polarized plug detachably connected to the receptacle. Terminals within the receptacle and connected to the trunk line are mated to the geophone terminals in the plug. The terminals to the hydrophones are not connected, leaving them inactive.

BRIEF DESCRIPTION OF THE DRAWINGS

A better understanding of the benefits and advantages of my invention may be obtained from the appended detailed description and the drawings, wherein:

FIG. 1 shows the instant invention deployed across several environments;

FIG. 2 is a generalized diagram of a single section of the instant invention;

FIG. 3 is a transverse section along line 3—3 of FIG. 2; and

FIG. 4 is a circuit diagram of the cable section shown in FIG. 2.

DETAILED DESCRIPTION OF THE PREFERRED EMBODIMENT

FIG. 1 shows a seismic cable 10 of this invention deployed along the earth's surface 12 under several environments consisting of shallow marine or lacustrine 14, shoreline 16, marsh 18, and terrestrial 20. A variety of sensor types are employed in transitional environment surveys, such as hydrophones 22, geophones 24, and marsh sensors 26. The marsh sensors 26 may contain both pressure and motion sensors within the same casing. The combination land/bay cable 10 may be connected to a recording unit 28 aboard a ship 30 or connected to a recording unit 32 on a vehicle 34 such as a truck or marsh buggy. A seismic signal may be generated offshore by a source (not shown) associated with the ship 30, or on land by an explosive charge or vibratory system on a truck. The seismic signals from the source propagate through the earth and are reflected back to the sensors 22, 24, and 26 by layers beneath the earth's surface. The reflected signals are detected by each sensor in which the signals are converted to electrical or modulated light pulses and sent up the cable 10 to the recording unit 28 or 32.

In the preferred embodiment of this invention, cable 10 consists of a plurality of cable sections 10' one of which is shown in FIG. 2. Each cable section 10' has a plurality of hydrophones 22 attached thereto at predetermined spacings. An impedance matching device 35 such as a transformer is detachably coupled to a watertight connector 36 also connected to cable section 10'. The several hydrophones 22 and the associated transformer 35 and connector 36 constitute a sensor group 37. A plurality of sensor groups 37 may be disposed along a single cable section 10'. Disposed at one end of cable section 10' is a jumper module 38. Module 38 is a well known circuit junction for activating preselected sensor groups 37 without disconnecting adjacent cable section 10' from each other. The ends of cable section 10' are terminated by suitable watertight end-couplers 40 and 42. For example but not by way of limitation, transformer 35 and module 38 are shown connected to the cable at the left hand portion of the drawing when in fact the transformer 35, connector 36, and module 38 may be positioned at any appropriate location along the cable section 10'.

Refer now to FIG. 3. Cable section 10' consists of a cable core 44 enclosing a stress member 46 and a plurality of conductors such as 48 through 56. It is to be understood that more than one hundred such conductors may extend the length of each cable section 10'.

The cable core 44 is surrounded by a flexible sheath 58 made of polyurethane or other like material. Molded around sheath 58, hydrophones 22, and connector 38 is a casing 60 which may be made of polyurethane or like material. Casing 60 provides added protection to wire connections and provides a rigid support for hydrophones 22 and connector 38. A like structure (not shown) is provided to house transformer 35.

FIG. 4 is a circuit diagram of a typical cable section 10' of this invention. Hydrophones 22 are connected to contacts within connector 36 by way of conductors 54 and 56 within cable core 44. Remaining contacts within connector 36 are attached to conductors 48 and 50 in cable core 44. The plurality of conductors such as 48 through 52 terminate at each end of the cable section 10' in suitable end-couplers 40 and 42 as mentioned above. Transformer 35 has an integral polarized connector 62 which detachably connects with connector 36 forming a watertight seal therebetween.

One or more geophones such as 24 are connected by conductors 64 and 66 to a polarized connector 68. The conductors 64 and 66 are attached to contacts in connector 68. With transformer 35 disconnected from polarized connector 36, connector 68 may be inserted connecting the geophones 24 to conductors 48 and 50. The hydrophone conductors 54 and 56 are not connected to an active circuit. It is to be understood that the connectors such as 36, 40, 42, 62, and 68 are of any well known type wherein a watertight connection is provided between the respective lines.

In operation, the combination land/bay cable 10, consisting of the interconnected sections 10', is deployed by a suitable vehicle along the line of survey. If the environment at a recording station requires hydrophones 22, transformer plug 35 remains plugged to connector 36 for each group 37 of hydrophones to be placed in the water. The transformer 35 may be disconnected from connector 36 and replaced by one or more geophones 24 attached by connector 68 to connector 36 when the cable 10 progresses onto land.

In another embodiment of this invention, hydrophones 22 are detachably connected to conductors 54 and 56 by a watertight polarized connector. The detachably coupled hydrophones 22 may be replaced if damaged.

For illustrative purposes, my invention has been described with a certain degree of specificity. Variations will occur to those skilled in the art but which may be included within the scope and spirit of this invention which is limited only by the appended claims.

I claim as my invention:

1. A combination bay/land cable including transmission means coupled to a remote recording device, comprising:
    (a) a plurality of pressure sensors coupled to said cable at predetermined spacings;
    (b) a plurality of connectors disposed along said cable at predetermined spacings, each of said connectors having a first conductor means coupled to at least one of said pressure sensors and a second conductor means coupled to said transmission means;
    (c) an impedance matching device, independent and separate from said pressure sensors, detachably coupled to a preselect number of said connectors for interconnecting at least one of said pressure sensors to said transmission means; and
    (d) at least one motion sensor detachably coupled to a preselected number of said connectors interconnecting said motion sensor to said transmission means.

2. A combination bay/land cable as defined in claim 1 wherein said pressure sensors are hydrophones.

3. A combination bay/land cable as defined in claim 1 wherein said motion sensor is a geophone.

4. In seismic exploration, a cable assembly for use on land and in water-covered environments, including a remote recording system, and a transmission means within said cable detachably connected to said recording system, comprising:
    (a) a plurality of first sensing means disposed along said cable at preselected spacings;
    (b) a first connector means coupled to said cable adjacent each first sensing means, said first connector means having terminals coupled to said transmission means and other terminals coupled to said first sensing means;
    (c) a second connector means matable with said first connector means for interconnecting said first sensing means to said transmission means for detecting pressure seismic signals; and
    (d) a third connector means matable with said first connector means for interconnecting a second sensing means to said transmission means for detecting motion seismic signals.

5. A cable assembly as defined in claim 4 wherein said first connector means is a first polarized connector.

6. A cable assembly as defined in claim 5 wherein said first sensing means comprises at least one pressure sensing means.

7. A cable assembly as defined in claim 6 wherein said second connector means comprises an impedance matching means connected to terminals in a second polarized connector matable with said first connector means.

8. A cable assembly as defined in claim 7 wherein said third connector means is a third polarized connector matable with said first connector means connecting at least one motion sensing means to said transmission means.

9. A cable assembly as defined in claim 8 wherein said motion sensing means is a geophone.

10. A cable assembly as defined in claim 9 wherein said impedance matching means is a transformer having a first conductor matable with said transmission means and a second conductor matable with said first sensing means.

11. A cable assembly as defined in claim 4 wherein said first sensing means are detachably coupled to said cable by watertight connectors.

12. A cable assembly as defined in claim 11 wherein said first sensing means is a plurality of integral transformers and hydrophone assemblies detachably coupled to said cable assembly.

13. A combination land/bay cable including a transmitting means connected to a remote recording device, comprising in combination:
   (a) a plurality of first connector means disposed along said cable at preselected spacings, each of said first connector means having a first and a second terminal set, said first terminal set connected to said transmitting means;
   (b) a plurality of pressure sensing means coupled to said cable at preselected spacings with at least one of said sensing means connected to said second terminal set on each of said first connector means;
   (c) impedance matching means coupled to a second connector means having first and second terminal sets matable with said first and second terminal sets of said first connector means for connecting said pressure sensing means to said transmitting means; and
   (d) motion sensing means coupled to a third connector means having a terminal set matable with said first terminal set of said first connector means for connecting said motion sensing means to said transmitting means, so that a preselected number of said impedance matching means may be coupled to a like number of first connector means having said pressure sensing means deployed in an aquatic environment, and a preselected number of said motion sensing means may be coupled to a like number of said first connector means having said pressure sensing means deployed on land.

* * * * *